US012377674B2

(12) United States Patent
Jogo et al.

(10) Patent No.: US 12,377,674 B2
(45) Date of Patent: Aug. 5, 2025

(54) RECORDING APPARATUS, METHOD, AND MEDIUM

(71) Applicant: CANON KABUSHIKI KAISHA, Tokyo (JP)

(72) Inventors: Jumpei Jogo, Tokyo (JP); Naoko Baba, Kanagawa (JP); Yuji Konno, Kanagawa (JP); Yoshitomo Marumoto, Kanagawa (JP); Shin Genta, Kanagawa (JP); Takayuki Ushiyama, Chiba (JP); Yumi Shimokodachi, Kanagawa (JP); Serena Yoshikawa, Kanagawa (JP); Taichi Yokokawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 17/932,924

(22) Filed: Sep. 16, 2022

(65) Prior Publication Data

US 2023/0086371 A1 Mar. 23, 2023

(30) Foreign Application Priority Data

Sep. 22, 2021 (JP) ................................ 2021-154546

(51) Int. Cl.
*B41J 2/21* (2006.01)
*B41M 7/00* (2006.01)

(52) U.S. Cl.
CPC .......... *B41M 7/0018* (2013.01); *B41J 2/2114* (2013.01)

(58) Field of Classification Search
CPC ............................ B41J 2/2114; B41M 7/0018
See application file for complete search history.

(56) References Cited

U.S. PATENT DOCUMENTS

2007/0019015 A1* 1/2007 Tatsumi ................ B41J 2/2114 347/12

FOREIGN PATENT DOCUMENTS

JP 2007276400 A 10/2007
JP 2018083299 A 5/2018

* cited by examiner

*Primary Examiner* — Scott A Richmond
(74) *Attorney, Agent, or Firm* — Canon U.S.A., Inc. IP Division

(57) ABSTRACT

A recording apparatus that causes less degradation of image quality due to blurring caused by dot misalignment between an ink containing a coloring material and a reaction liquid includes a recording unit configured to record an image on a recording medium by applying an ink containing a coloring material and a reaction liquid containing a component that aggregates the coloring material, an acquisition unit configured to acquire multi-valued ink data to apply the ink, and a generating unit configured to generate first multi-valued reaction liquid data based on the multi-valued ink data and, when a tone value of a pixel of interest in the first multi-valued reaction liquid data is lower than a tone value of any one of a plurality of surrounding pixels around the pixel of interest, generate second multi-valued reaction liquid data by increasing the tone value of the pixel of interest.

5 Claims, 15 Drawing Sheets

| | | | | |
|---|---|---|---|---|
| (i+2,j-2) | (i+2,j-1) | (i+2,j) | (i+2,j+1) | (i+2,j+2) |
| (i+1,j-2) | (i+1,j-1) | (i+1,j) | (i+1,j+1) | (i+1,j+2) |
| (i,j-2) | (i,j-1) | (i,j) | (i,j+1) | (i,j+2) |
| (i-1,j-2) | (i-1,j-1) | (i-1,j) | (i-1,j+1) | (i-1,j+2) |
| (i-2,j-2) | (i-2,j-1) | (i-2,j) | (i-2,j+1) | (i-2,j+2) |

FIG. 10A

| | | | | |
|---|---|---|---|---|
| (i+1,j-2) | (i+1,j-1) | (i+1,j) | (i+1,j+1) | (i+1,j+2) |
| (i,j-2) | (i,j-1) | (i,j) | (i,j+1) | (i,j+2) |
| (i-1,j-2) | (i-1,j-1) | (i-1,j) | (i-1,j+1) | (i-1,j+2) |

FIG. 10B

| | | | | | | | | | | | | | | | | | | | | | | | | |
|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 64 | 64 | 64 | 64 | 64 | 64 | 64 | 64 | 64 | 64 | 64 | 64 | 32 | 32 | 32 | 32 | 32 | 32 | 32 | 32 | 32 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 11A

| | | | | |
|---|---|---|---|---|
| (i+2,j-2) | (i+2,j-1) | (i+2,j) | (i+2,j+1) | (i+2,j+2) |
| (i+1,j-2) | (i+1,j-1) | (i+1,j) | (i+1,j+1) | (i+1,j+2) |
| (i,j-2) | (i,j-1) | (i,j) | (i,j+1) | (i,j+2) |
| (i-1,j-2) | (i-1,j-1) | (i-1,j) | (i-1,j+1) | (i-1,j+2) |
| (i-2,j-2) | (i-2,j-1) | (i-2,j) | (i-2,j+1) | (i-2,j+2) |

FIG. 11B

| | | | | | | | | | | | | | | | | | | | | | | | | |
|---|---|---|---|---|---|---|---|---|---|---|---|---|---|---|---|---|---|---|---|---|---|---|---|---|
| 0 | 0 | 48 | 48 | 48 | 48 | 48 | 48 | 48 | 48 | 48 | 48 | 48 | 48 | 16 | 16 | 16 | 16 | 16 | 16 | 16 | 16 | 16 | 0 | 0 |
| 0 | 0 | 48 | 48 | 48 | 48 | 48 | 48 | 48 | 48 | 48 | 48 | 48 | 48 | 16 | 16 | 16 | 16 | 16 | 16 | 16 | 16 | 16 | 0 | 0 |
| 0 | 0 | 48 | 48 | 64 | 64 | 64 | 64 | 64 | 64 | 64 | 64 | 58 | 58 | 32 | 32 | 32 | 32 | 32 | 32 | 32 | 16 | 16 | 0 | 0 |
| 0 | 0 | 48 | 48 | 64 | 64 | 64 | 64 | 64 | 64 | 64 | 64 | 58 | 58 | 32 | 32 | 32 | 32 | 32 | 32 | 32 | 16 | 16 | 0 | 0 |
| 0 | 0 | 48 | 48 | 64 | 64 | 64 | 64 | 64 | 64 | 64 | 64 | 58 | 58 | 32 | 32 | 32 | 32 | 32 | 32 | 32 | 16 | 16 | 0 | 0 |
| 0 | 0 | 48 | 48 | 64 | 64 | 64 | 64 | 64 | 64 | 64 | 64 | 58 | 58 | 32 | 32 | 32 | 32 | 32 | 32 | 32 | 16 | 16 | 0 | 0 |
| 0 | 0 | 48 | 48 | 64 | 64 | 64 | 64 | 64 | 64 | 64 | 64 | 58 | 58 | 32 | 32 | 32 | 32 | 32 | 32 | 32 | 16 | 16 | 0 | 0 |
| 0 | 0 | 48 | 48 | 64 | 64 | 64 | 64 | 64 | 64 | 64 | 64 | 58 | 58 | 32 | 32 | 32 | 32 | 32 | 32 | 32 | 16 | 16 | 0 | 0 |
| 0 | 0 | 48 | 48 | 64 | 64 | 64 | 64 | 64 | 64 | 64 | 64 | 58 | 58 | 32 | 32 | 32 | 32 | 32 | 32 | 32 | 16 | 16 | 0 | 0 |
| 0 | 0 | 48 | 48 | 64 | 64 | 64 | 64 | 64 | 64 | 64 | 64 | 58 | 58 | 32 | 32 | 32 | 32 | 32 | 32 | 32 | 16 | 16 | 0 | 0 |
| 0 | 0 | 48 | 48 | 48 | 48 | 48 | 48 | 48 | 48 | 48 | 48 | 48 | 48 | 16 | 16 | 16 | 16 | 16 | 16 | 16 | 16 | 16 | 0 | 0 |
| 0 | 0 | 48 | 48 | 48 | 48 | 48 | 48 | 48 | 48 | 48 | 48 | 48 | 48 | 16 | 16 | 16 | 16 | 16 | 16 | 16 | 16 | 16 | 0 | 0 |

RECORDING APPARATUS, METHOD, AND MEDIUM

BACKGROUND

Field of the Disclosure

The present disclosure relates to a recording apparatus, an image-processing apparatus, a recording method, an image-processing method, and a recording medium.

Description of the Related Art

There is known a recording apparatus for recording an image on a recording medium by applying a recording agent, such as an ink. In such a recording apparatus, it is known that ink droplets containing a coloring material come into contact with and attract each other on a recording medium and cause blurring (bleeding). To prevent the blurring (bleeding), a reaction liquid that reacts with the coloring material contained in the ink is used. The reaction liquid comes into contact with the ink containing the coloring material on the recording medium and aggregates the coloring material in the ink. An excessive amount of reaction liquid to aggregate the coloring material, however, causes excessive aggregation of the coloring material and may reduce the gloss of the recorded material. Thus, the application amount of reaction liquid should be appropriately determined and is known to be determined on the basis of the amount of coloring material ink.

Japanese Patent Laid-Open No. 2018-083299 discloses a method of making the application region of a processing liquid larger than the application region of a coloring material ink.

SUMMARY

The present disclosure provides a recording apparatus that causes less degradation of image quality due to blurring caused by dot misalignment between an ink containing a coloring material and a reaction liquid.

The present disclosure includes a recording unit configured to record an image on a recording medium by applying an ink containing a coloring material and a reaction liquid containing a component that aggregates the coloring material, an acquisition unit configured to acquire multi-valued ink data to apply the ink, and a generating unit configured to generate first multi-valued reaction liquid data based on the multi-valued ink data and, when a tone value of a pixel of interest in the first multi-valued reaction liquid data is lower than a tone value of any one of a plurality of surrounding pixels around the pixel of interest, generate second multi-valued reaction liquid data by increasing the tone value of the pixel of interest.

Further features of the present disclosure will become apparent from the following description of exemplary embodiments with reference to the attached drawings.

BRIEF DESCRIPTION OF THE DRAWINGS

FIGS. 10A and 10B are explanatory views of multi-valued expansion filtering according to a third embodiment.

FIGS. 11A and 11B are explanatory views of multi-valued expansion filtering according to a fourth embodiment.

DESCRIPTION OF THE EMBODIMENTS

Various exemplary embodiments, features, and aspects of the disclosure will be described below with reference to the drawings that may have different characteristics, advantages, disadvantages, performance parameters, or the like.

First Embodiment

A first embodiment of the present disclosure is described below with reference to the accompanying drawings.

Configuration of Ink Jet Recording Apparatus

Figure 2:
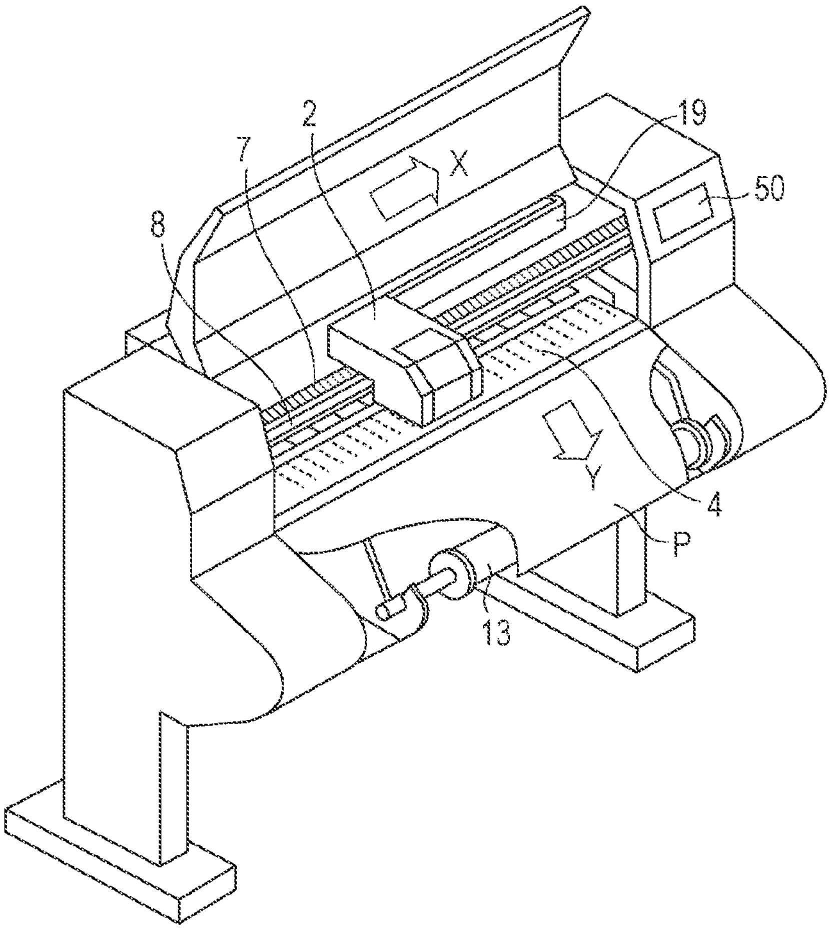
FIG. 2 is a perspective view of a recording apparatus according to a first embodiment.

FIG. 2 is a view of an outer appearance of an ink jet recording apparatus (hereinafter also referred to as a recording apparatus) according to the present embodiment. The recording apparatus according to the present embodiment is a serial type recording apparatus and records an image by moving a recording head in a direction (X direction) across the conveying direction (Y direction) of a recording medium P.

Figure 3:
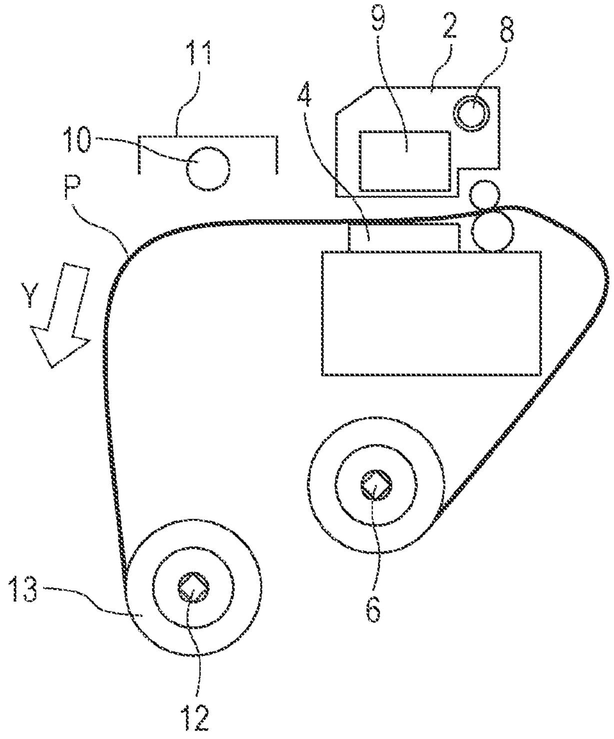
FIG. 3 is a schematic view of a heating portion of the recording apparatus according to the first embodiment.

The configuration of the ink jet recording apparatus according to the present embodiment and the outline of the recording operation are described below. First, the recording medium P is held on a spool 6, as shown in FIG. 3. A conveying roller is driven by a convey motor (not shown) via a gear, and the recording medium P is conveyed from the spool 6 in the conveying direction (Y direction).

At a predetermined conveyance position, a carriage motor (not shown) is driven to reciprocally move (reciprocate) a carriage unit 2 along a guide shaft 8 extending in the X direction. While the scanning, an image is recorded by ejecting ink droplets from an ejection port provided in a recording head mounted on the carriage unit 2 with the timing based on a position signal obtained by the encoder 7. At this time, an image is recorded in a region with a width (hereinafter referred to as a bandwidth) corresponding to an array range of a plurality of ejection ports arranged in the recording head. In the present embodiment, ink droplets are ejected at a scanning speed of 40 inch/second, and the recording resolution is 1200 dpi (dot/inch). After the recording medium P is conveyed, an image is recorded in the next region of the bandwidth by the next print scanning of the carriage unit 2.

Driving force may be transmitted from the carriage motor to the carriage unit 2 via a carriage belt. The carriage belt may be replaced with another drive system, for example, which includes a lead screw rotationally driven by a carriage motor and extending in the X direction and an engaging portion provided in the carriage unit 2 and engaging with a groove of the lead screw.

The conveyed recording medium P is held between a feed roller and a pinch roller and is conveyed to a recording position on a platen 4. This recording position corresponds to a scanning region of the recording head mounted on the carriage unit 2. In a resting state, an orifice face of the recording head is typically capped. Thus, the cap is opened before the recording operation to allow the recording head and the carriage unit 2 to move. When data corresponding to one print scan is stored in a buffer, the carriage motor is driven to move the carriage unit 2 for the recording operation described above.

A recording element for ejecting ink as a droplet is provided inside each ejection port of a recording head 9. A flexible printed circuit board 19 is provided to supply a driving pulse for driving the recording element, a head temperature adjustment signal, and the like. One end of the flexible board is coupled to a controller (not shown) including a control circuit, such as a central processing unit (CPU), a processor, circuitry or other control processing configuration, for controlling the recording apparatus.

A user can input and confirm an instruction to stop the recording operation, information of the recording medium P, and the like on a user interface (UI) screen 50.

FIG. 3 is a side view of the recording apparatus main body of FIG. 2. A heater 10 supported by a frame (not shown) is provided in a curing region located downstream in the conveying direction (in the Y direction in the figure) from a position at which the recording head 9 mounted on the carriage unit 2 reciprocally moves. A liquid ink applied to the recording medium P is dried by heat from the heater 10. The heater 10 is covered with a heater cover 11, and the heater cover 11 has the function of efficiently irradiating the recording medium P with the heat of the heater 10 and the function of protecting the heater 10. The heater 10 is, for example, a sheathed heater or a halogen heater. The heating temperature of a heating portion in the curing region can be determined in consideration of the film-forming properties and productivity of water-soluble resin fine particles and the heat resistance of the recording medium P. The heating portion in the curing region may be heated by hot air blowing from above or with a contact type heat conduction heater under the recording medium. Furthermore, the heating portion in the curing region is heated at one position in the present embodiment but may be heated at two or more positions, provided that the temperature on the recording medium P measured with a radiation thermometer (not shown) does not exceed the set value of the heating temperature. The recording medium P to which an ink is applied from the recording head 9 to record an image is wound by a take-up spool 12 as a rolled medium 13.

Configuration of Recording Head

Figure 4:
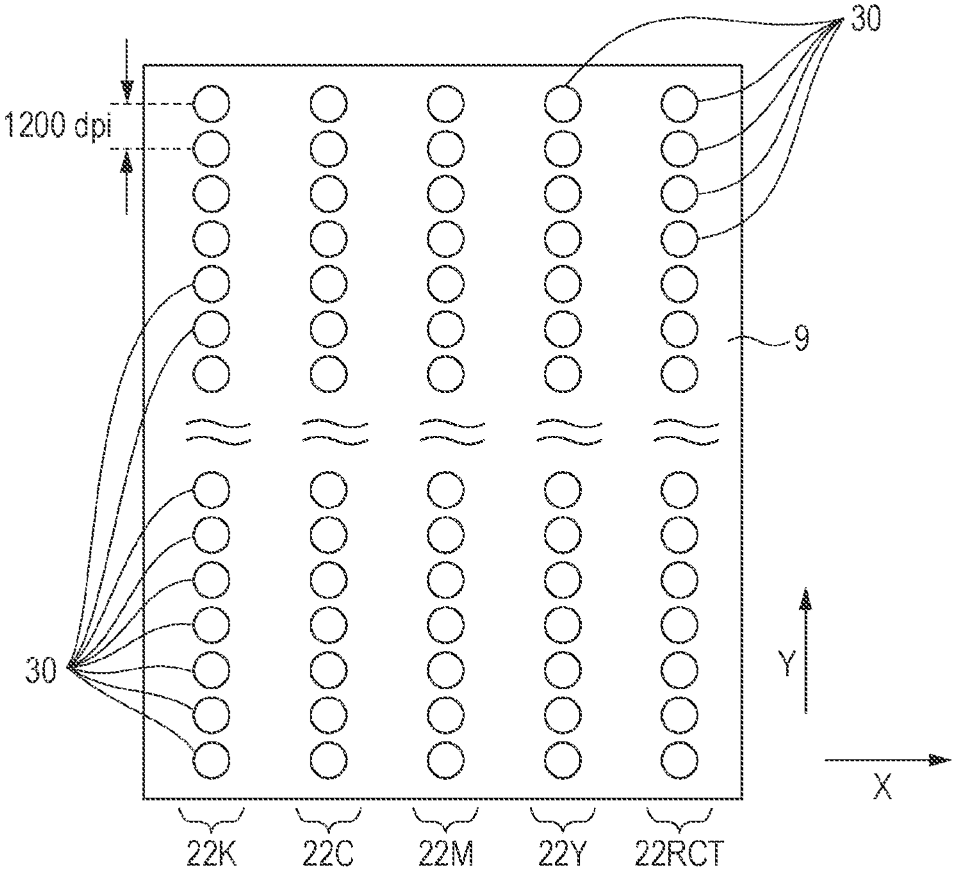
FIG. 4 is a schematic view of a recording head according to the first embodiment.

FIG. 4 is a view of the recording head 9 according to the present embodiment. The recording head 9 includes a plurality of ejection port arrays each including a plurality of ejection ports for ejecting an ink containing a coloring material. The recording head 9 according to the present embodiment includes an ejection port array 22K for ejecting a black ink (K), an ejection port array 22C for ejecting a cyan ink (C), an ejection port array 22M for ejecting a magenta ink (M), and an ejection port array 22Y for ejecting a yellow ink (Y). Each of the black ink (K), cyan ink (C), magenta ink (M), and yellow ink (Y) contains a coloring material and is hereinafter also referred to as a coloring material ink for the sake of simplicity.

The recording head 9 according to the present embodiment includes an ejection port array 22RCT for ejecting a reaction liquid (RCT). The reaction liquid contains a reactive component that reacts with a coloring material contained in the coloring material inks. When a coloring material ink comes into contact with the reaction liquid on a recording medium, the component of the reaction liquid can aggregate the coloring material in the coloring material ink and thereby reduce blurring (bleeding). The reaction liquid according to the present embodiment contains no coloring material.

As illustrated in the figure, the recording head 9 includes the ejection port arrays 22K, 22C, 22M, 22Y, and 22RCT in this order. These ejection port arrays 22K, 22C, 22M, 22Y, and 22RCT include 1280 ejection ports 30 for ejecting their respective inks arranged in the Y direction (in the array direction) at a density of 1200 dpi. In the present embodiment, the amount of ink ejected from one ejection port 30 at a time is approximately 4.5 pl.

Each of these ejection port arrays is coupled to an ink tank (not shown) for storing their respective inks, and the ink is supplied from each ink tank. The recording head 9 and the ink tank may be a single body or may be separable. Detailed compositions of the black ink (K), cyan ink (C), magenta ink (M), yellow ink (Y), and reaction liquid (RCT) are described later.

Each coloring material ink may contain water-soluble resin fine particles that form a film by heating and improve the scratch resistance of a recorded material. Furthermore, a clear emulsion ink (Em) containing water-soluble resin fine particles and no coloring material may be further ejected as an ink different from the coloring material ink or the reaction liquid. In such a case, the recording head 9 includes an ejection port array 22Em for ejecting the clear emulsion ink.

Ink Composition

Next, each ink constituting an ink set according to the present embodiment is described in detail below. Unless otherwise specified, the terms "part" and "%" are based on mass.

Composition of Each Ink

The composition of each ink is described in detail below.

Each of the coloring material inks (C, M, Y, and K) and the reaction liquid (RCT) used in the present embodiment contains a water-soluble organic solvent. The water-soluble organic solvent preferably has a boiling point in the range of 150° C. to 300° C. in terms of the wettability and moisture retention of an orifice surface of the recording head 9. The water-soluble organic solvent can be a ketone compound, such as acetone or cyclohexanone, a propylene glycol derivative, such as tetraethylene glycol dimethyl ether, or a heterocyclic compound with a lactam structure exemplified by N-methyl-pyrrolidone or 2-pyrrolidone, in terms of the function of a film-forming aid for resin fine particles and swelling solubility in a recording medium with a resin layer. The water-soluble organic solvent content preferably ranges from 3% to 30% by weight in terms of ejection performance. More specifically, the water-soluble organic solvent is, for example, an alkyl alcohol having 1 to 4 carbon atoms, such as methyl alcohol, ethyl alcohol, n-propyl alcohol, isopropyl alcohol, n-butyl alcohol, sec-butyl alcohol, or tert-butyl alcohol; an amide, such as dimethylformamide or dimethylacetamide; a ketone or keto-alcohol, such as acetone or diacetone alcohol; an ether, such as tetrahydrofuran or dioxane; a poly(alkylene glycol), such as poly(ethylene glycol) or poly(propylene glycol); an alkylene glycol with an alkylene group having 2 to 6 carbon atoms, such as ethylene glycol, propylene glycol, butylene glycol, triethylene glycol, 1,2,6-hexanetriol, thiodiglycol, hexylene glycol, or diethylene glycol; a lower alkyl ether acetate, such as polyethylene glycol monomethyl ether acetate; glycerin; a lower alkyl ether of a polyhydric alcohol, such as ethylene glycol monomethyl(or ethyl) ether, diethylene glycol methyl (or ethyl) ether, or triethylene glycol monomethyl(or ethyl) ether; a polyhydric alcohol, such as trimethylolpropane or trimethylolethane; or N-methyl-2-pyrrolidone, 2-pyrrolidone, or 1,3-dimethyl-2-imidazolidinone. These water-soluble organic solvents may be used alone or in combination. The water can be deionized water. The reaction liquid (RCT) may have any water-soluble organic solvent content. In addition to the components described above, if desirable, the coloring material ink (C, M, Y, or K) may contain a surfactant, an antifoaming agent, a preservative, and/or a fungicide to have desired physical properties.

Each of the coloring material inks (C, M, Y, and K) and the reaction liquid (RCT) used in the present embodiment contains a surfactant. The surfactant is used as a penetrant to improve the permeation of the ink into an ink jet recording medium. A larger addition amount of the surfactant more greatly reduces the surface tension of the ink and improves the wettability and permeation of the ink to a recording medium. In the present embodiment, a small amount of an acetylenic glycol EO adduct or the like is added as a surfactant such that each ink has a surface tension of 30 dyn/cm or less and that the difference in surface tension between the inks is 2 dyn/cm or less. More specifically, all the inks have a surface tension in the range of approximately 22 to 24 dyn/cm. The surface tension is measured with a fully-automatic surface tensiometer CBVP-Z (manufactured by Kyowa Interface Science Co., Ltd.). Any measuring instrument that can measure the surface tension of ink may be used instead.

The pH of each ink according to the present embodiment is stable on the alkaline side and ranges from 8.5 to 9.5. Each ink preferably has a pH in the range of 7.0 to 10.0 to prevent the elution or degradation of a member in contact with the ink in a recording apparatus or a recording head, to prevent a decrease in solubility of a resin dispersed in the ink, or the like. The pH is measured with a pH meter F-52 manufactured by Horiba, Ltd. Any measuring instrument that can measure the pH of ink may be used instead.

A white ink (W) or a metallic ink (Mt) may also be used as a coloring material ink.

Reaction Liquid

As described above, to prevent blurring (bleeding) and other problems, the reaction liquid contains a reactive component for partly or entirely insolubilizing a solid component of a coloring material ink. It aims to insolubilize a dye dissolved in or a pigment and a resin dispersed in a coloring material ink. The reaction liquid is, for example, a solution containing a polyvalent metal ion (for example, magnesium nitrate, magnesium chloride, aluminum sulfate, iron chloride, or the like). For aggregation with such a cation, a system with a low-molecular-weight cationic polymer coagulant may also be used to neutralize the charges of water-soluble resin fine particles and insolubilize an anionic soluble substance.

Another reaction system may be an insolubilization system with a reaction liquid utilizing a difference in pH. As described above, most of the coloring material inks typically used for ink jet recording are stable on the alkaline side due to the properties of the coloring materials and the like. The pH typically ranges from approximately 7 to 10 and often ranges from 8.5 to 9.5 from an industrial perspective and in consideration of the effects of external environment. To aggregate and solidify a coloring material ink of such a system, an acidic solution may be mixed to change the pH and break the stable state, thereby aggregating a dispersed component. For such action, an acidic solution may be used as a reaction liquid.

Water-Soluble Resin Fine Particles

A coloring material ink used in the present embodiment contains water-soluble resin fine particles. The term "water-soluble resin fine particles" refers to polymer fine particles dispersed in water. Specific examples include acrylic resin fine particles synthesized by emulsion polymerization of a monomer, such as a (meth)acrylic acid alkyl ester or a (meth)acrylic acid alkyl amide; styrene-acrylic resin fine particles synthesized by emulsion polymerization of a (meth)acrylic acid alkyl ester or a (meth)acrylic acid alkyl amide and a styrene monomer; polyethylene resin fine particles, polypropylene resin fine particles, polyurethane resin fine particles, and styrene-butadiene resin fine particles. Other examples include core-shell resin fine particles composed of a core and a shell with different polymer compositions and resin fine particles produced by emulsion polymerization around seed particles, which are acrylic fine particles synthesized in advance to control the particle size. Still other examples include hybrid resin fine particles produced by chemically bonding different resin fine particles, such as acrylic resin fine particles and urethane resin fine particles. Water-soluble resin fine particles are not necessarily contained in a coloring material ink and may be contained in a clear emulsion ink (Em).

Recording Medium

The recording apparatus according to the present embodiment is used for recording on a low-permeability recording medium through which little water penetrates. The term "low-permeability recording medium", as used herein, refers to a medium with little or no water absorbency, as described above. Thus, an aqueous ink containing no organic solvent is repelled and cannot form an image. On the other hand, such a medium has high water resistance and weatherability and is suitable as a medium for a printed article used outdoors. A recording medium typically used has a water contact angle of 45 degrees or more, preferably 60 degrees or more, at 25° C.

The low-permeability recording medium may be a recording medium with a plastic layer formed on the outermost surface of a substrate, a recording medium without an ink-receiving layer on a substrate, or a sheet, film, or banner made of glass, synthetic paper, or plastic. The applied plastic is, for example, poly(vinyl chloride), poly(ethylene terephthalate), polycarbonate, polystyrene, polyurethane, polyethylene, or polypropylene. Due to their high water resistance, light fastness, and scratch resistance, these low-permeability recording media are typically used for recorded materials for outdoor exhibition.

A method for evaluating the permeability of a recording medium may be a Bristow method described in a JAPAN TAPPI paper pulp test method No. 51, "Kami oyobi itagami no ekitai kyushusei shiken hoho (a liquid absorption test method for paper and paper board)". In the Bristow method, a predetermined amount of ink is injected into a holding container with an opening slit of a predetermined size and is brought into contact with a recording medium processed into a strip and wound around a disk through the slit. The disk is rotated while the holding container is fixed. The area (length) of an ink band transferred to the recording medium is measured. The amount of transfer per unit area (mL/m2) per second can be calculated from the area of the ink band. In the present embodiment, a recording medium with an amount of transferred ink (the amount of water absorption) of less than 10 mL/m2 at 30 msec1/2 measured by the Bristow method is regarded as a low-permeability recording medium.

Blurring at Boundary between Regions with Different Duties

Figure 1A:
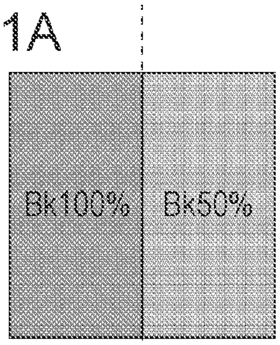
FIGS. 1A to 1F are views illustrating a problem to be solved by the present disclosure.
Figure 1B:
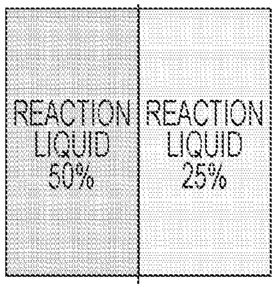
Figure 1C:
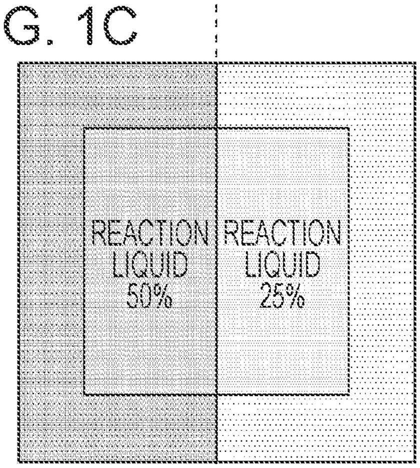
Figure 1D:
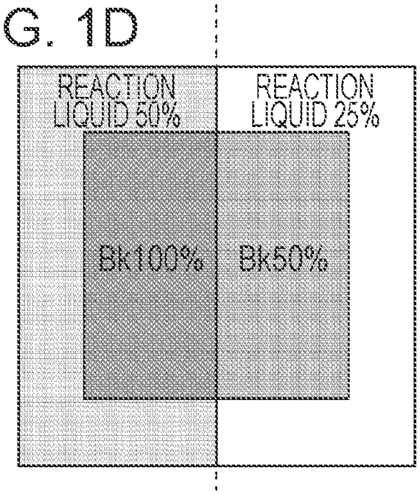

A problem in the application of a known recording control method is described below as a comparative example. FIG. 1A illustrates input image data. The application amount of black ink (K) per unit area is 100% in the left half region and 50% in the right half region. The application amount per unit area is referred to as a duty. In the present embodiment, the application of four dots per pixel of 600 dpi×600 dpi is regarded as a duty of 100%. FIG. 1B illustrates reaction liquid data based on the K ink data of FIG. 1A. The reaction liquid data shows that 50% of a reaction liquid is applied to a region in which the K ink has a duty of 100%, and 25% of the reaction liquid is applied to a region in which the K ink has a duty of 50%. FIG. 1C illustrates multi-valued expanded reaction liquid data, and FIG. 1D illustrates the K ink data and the reaction liquid data superimposed. Expanding the application region of the reaction liquid to make this application region wider than the application region of the coloring material ink, as illustrated in FIG. 1C, can reduce blurring at the edge of the application region of the coloring material ink.

Figure 1E:
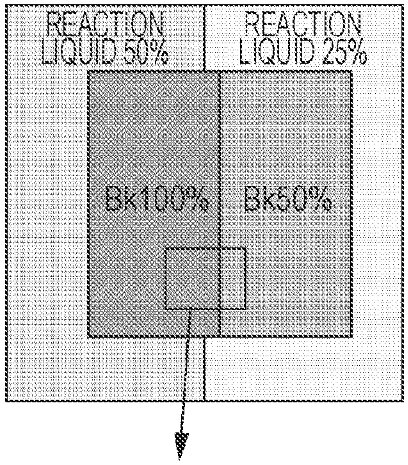
Figure 1F:
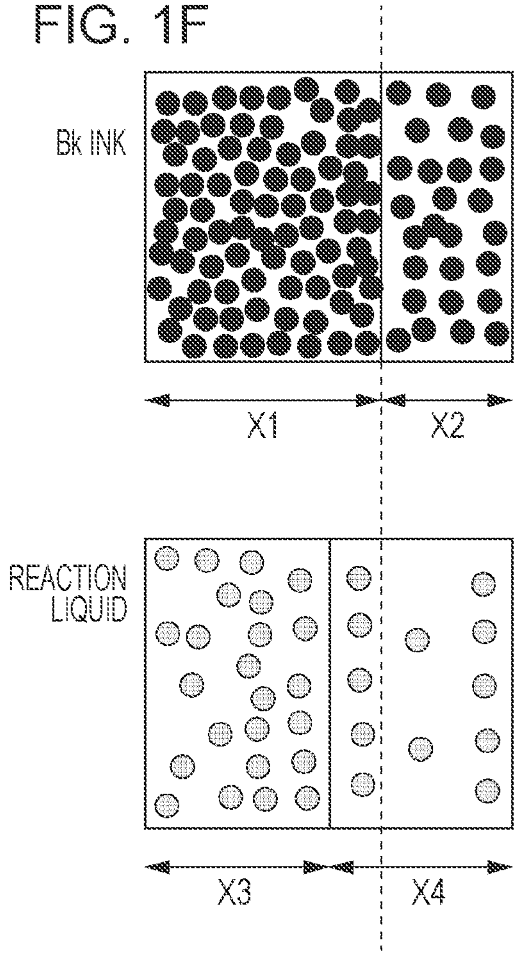

When the coloring material ink and the reaction liquid are applied as illustrated in FIG. 1D, and at least one of the coloring material ink and the reaction liquid has dot misalignment, it was found that blurring occurs at a boundary between two regions in which the coloring material ink has different duties. FIG. 1E illustrates dot misalignment of the coloring material ink, and FIG. 1F is an enlarged view of the boundary section. Although the reaction liquid can have a duty of 50% in a region X1 in which the K ink has a duty of 100%, the reaction liquid has a duty of 50% in a region X3 and 25% in a region X4. Thus, in the region X1, the reaction liquid is insufficient in quantity for the coloring material ink, and consequently the coloring material ink may be blurred. As described above, when dot misalignment occurs such that a region with a larger application amount of the coloring material ink extends into a region with a smaller application amount of the reaction liquid, it may cause blurring at a boundary section between regions in which the coloring material ink has different duties.

By contrast, the present embodiment reduces blurring at a boundary section between two regions in which the coloring material ink has different duties by changing the application amount in accordance with the reaction liquid data based on the ink data of the coloring material ink. A specific method is described later with reference to FIGS. 8A to 8D.

Configuration of Recording System

Figure 5:
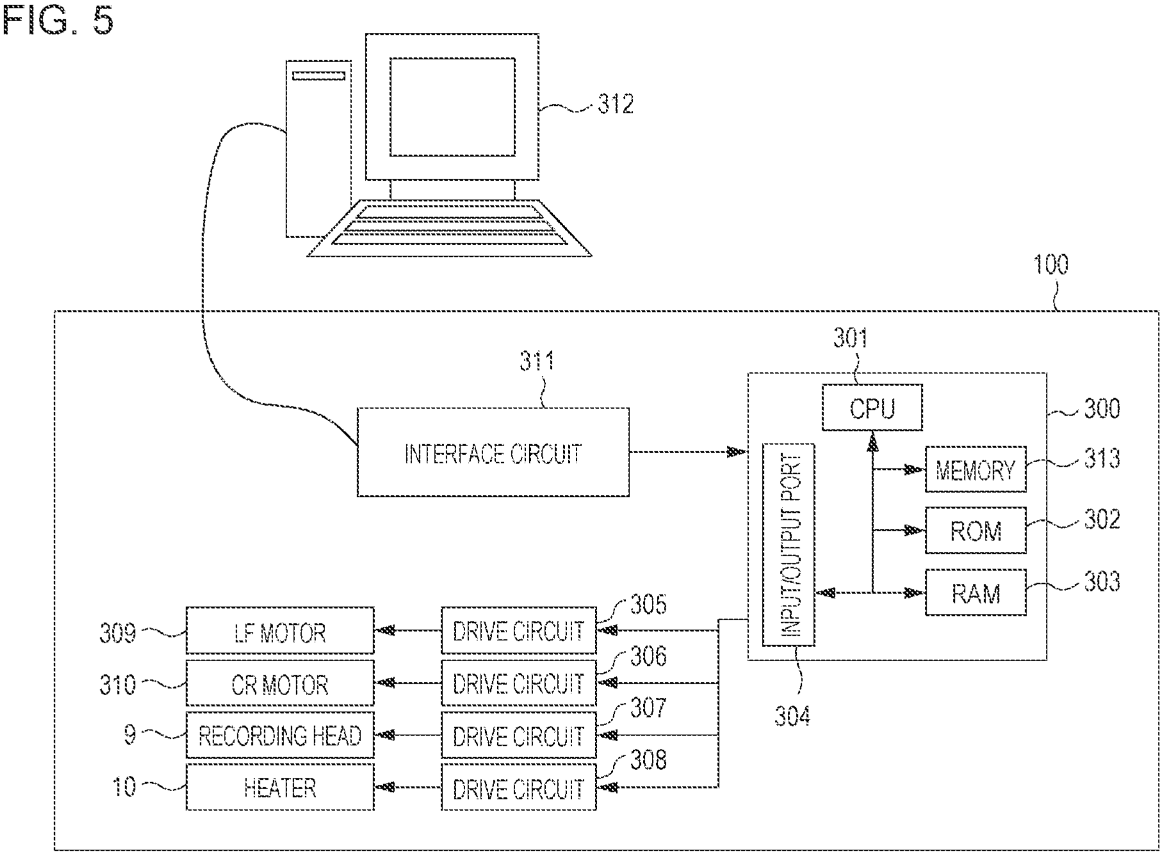
FIG. 5 is a schematic view of a recording control system according to the first embodiment.

FIG. 5 is a block diagram of a schematic configuration of a control system in a recording apparatus 100 according to the present embodiment. A main controller 300 includes a CPU 301 for performing processing operations, such as calculation, selection, discrimination, and control, and recording operations, a read-only memory (ROM) 302 for storing a control program to be executed by the CPU 301, a random access memory (RAM) 303 used as a buffer for recording data, an input/output port 304, and the like. A memory 313 stores a mask pattern and the like, as described later. The input/output port 304 is coupled to drive circuits 305, 306, 307, and 308, such as actuators, in a convey motor (LF motor) 309, a carriage motor (CR motor) 310, the recording head 9, the heater 10, and a cutting unit. The main controller 300 is coupled to a host PC 312 via an interface circuit 311.

Image-Processing Flow

Figure 6:
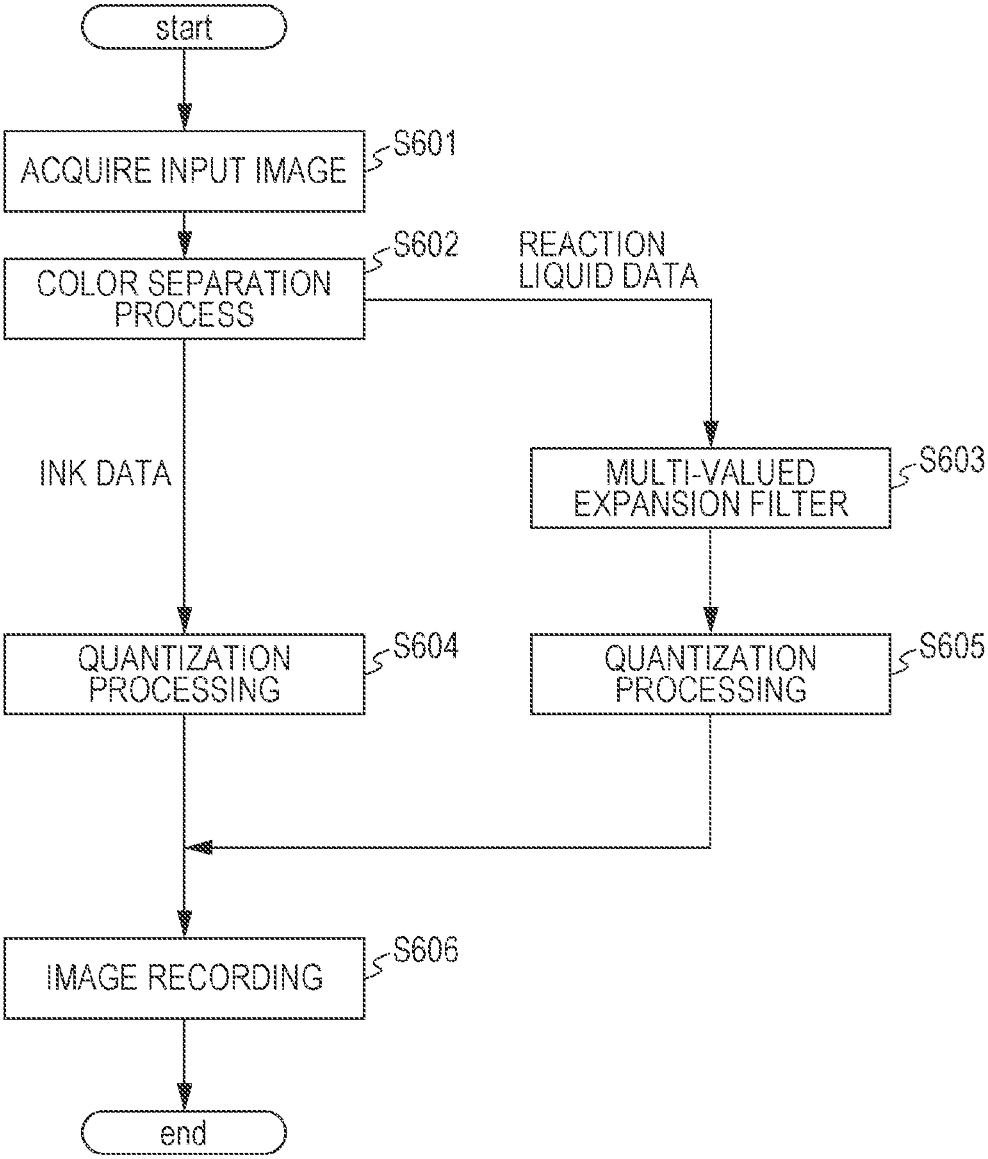
FIG. 6 is a flow chart of image data processing according to the first embodiment.

FIG. 6 is an explanatory flow chart of image processing. Processing for generating ejection data for image recording in the recording apparatus from input image data is described below with reference to FIGS. 5 and 6. This processing may be performed by the host apparatus 312 or the recording apparatus 100 or may be performed partly by the host apparatus 312 and partly by the recording apparatus 100.

The host apparatus 312 is, for example, a personal computer (PC). The host apparatus 312 includes an application (not shown) and a printer driver (not shown) for the recording apparatus 100. The application performs processing for generating recorded image data to be transmitted to the printer driver and processing for setting information on print control on the basis of information specified by the user on a user interface (UI) screen of the host apparatus 312.

The recorded image data and the information on print control processed by the application are transmitted to the printer driver at the time of recording. The recorded image data are then transmitted to the recording apparatus 100 via the interface circuit 311 from the host apparatus 312 in which the printer driver is installed. The main controller 300 of the recording apparatus 100 performs image processing on the transmitted recorded image data.

The following program is stored in the memory 313 built in the main controller 300 of the recording apparatus 100 and is executed by the CPU 301. In FIG. 6, input image data are acquired in a step S601 and are stored in a storage unit, such as a memory, of the recording apparatus. In a step S602, in an image-processing configuration described later, a color separation process is performed to generate multi-valued ink data of coloring material ink colors (CMYK) used for recording and multi-valued reaction liquid data. In a step S603, a conversion process is performed in which the tone value of each pixel in the multi-valued reaction liquid data is replaced with the maximum tone value of surrounding pixels using a multi-valued expansion filter, which is a characteristic configuration of the present embodiment. The conversion process using the multi-valued expansion filter is described later with reference to FIGS. 8A to 8D. In steps S604 and S605, quantization processing is performed to quantize the multi-valued ink data of CMYK after the color separation process and the multi-valued reaction liquid data subjected to a multi-valued expansion process. An image is then recorded on the basis of the quantization data quantized in the steps S604 and S605.

Figure 7:
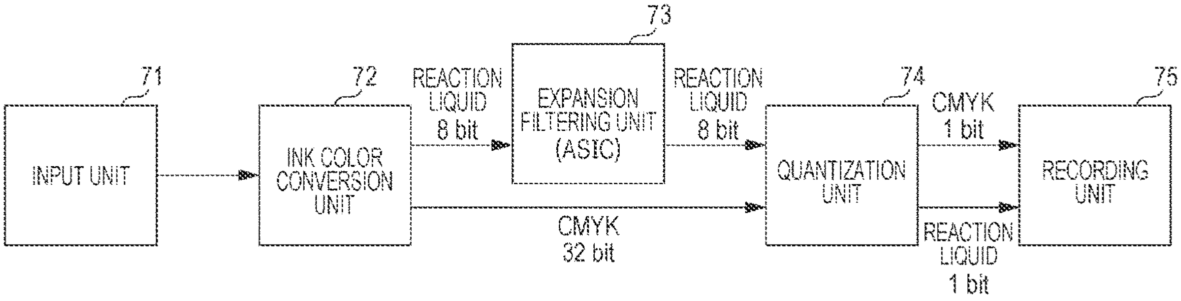
FIG. 7 is a functional block diagram of a schematic configuration for image data processing of an image-processing system according to the first embodiment.

FIG. 7 is an explanatory view of an image-processing unit that processes recorded image data and converts them into ejection data of a recording head on the basis of the image-processing flow described in the flow chart of FIG. 6. Image data to be recorded are input to an input unit 71. The image data are input as 8-bit data of each red, green, blue (RGB), 24-bit data in total. An ink color conversion unit 72 converts the RGB data into 8 bits each of coloring material ink colors CMYK of an ink jet recording apparatus according to the present disclosure, 32 bits in total of the four colors, and 8 bits of reaction liquid data. The values of 8 bits each of CMYK and 8 bits of the reaction liquid represent the amount of each coloring material ink color and the amount of the reaction liquid. For the values in the range of 0 to 255 of 8 bits each of CMYK and 8 bits of the reaction liquid, 0 represents that the amount of each coloring material ink or the reaction liquid is 0%, 255 represents that the amount of each coloring material ink or the reaction liquid is 100%, and an intermediate value between 0 to 255 represents the corresponding amount of each coloring material ink or the reaction liquid. An expansion filtering unit 73 in the present embodiment functions as a square maximum value filter. This maximum value filter replaces a tone value in the range of 0 to 255 of a pixel of interest in the 8-bit data of the reaction liquid with the maximum tone value in the range of 0 to 255 of pixels in a square range centered on the pixel of interest. The range of the maximum value filter depends on variations in landing between the coloring material inks and the reaction liquid. Application of the maximum value filter to all the pixels of the reaction liquid data expands a high-duty region and replaces a tone value of a pixel at a boundary section between the high-duty region and a low-duty region with a higher tone value. A quantization unit 74 converts the 8-bit data of each of CMYK converted in the step S602 and the 8-bit data of the reaction liquid expanded in the expansion filtering unit 73 into binary or multi-valued data that indicate ejection (application) or non-ejection (non-application) of ink from the recording head. Although the quantization processing in the quantization unit 74 is dithering in the present embodiment, the quantization processing may be any processing, such as error-diffusion processing. The recording unit 75 records an image on a recording medium by controlling the ejection of ink from the recording head on the basis of the binary or multi-valued CMYK data and reaction liquid data converted by the quantization processing in the quantization unit 74. In this figure, the CMYK and reaction liquid data quantized by the quantization unit 74 are data of 1 bit per pixel but may be data of 2 bits or more.

Multi-Valued Expansion Filtering Method

FIGS. 8A to 8D are explanatory views of a multi-valued expansion filter in the step S603. The multi-valued expansion filter in the present embodiment is performed as a function of an application specific integrated circuit (abbreviation: ASIC). The multi-valued expansion filter applies a maximum value filter of 5×5 pixels illustrated in FIG. 8A to a pixel of interest (i, j). The value of the pixel of interest (i, j) is updated to the maximum tone value of 25 pixels of 5×5 pixels centered on the pixel of interest. When the maximum value Max(i+m, j+n) of 8-bit values of surrounding pixels (i+m, j+n) is larger than the 8-bit value f(i, j) of the pixel of interest (i, j), the output value g(i, j) of the pixel of interest (i, j) is represented by the formula 1:

$$g(i,j)=\mathrm{Max}(i+m,j+n) \quad (1)$$

and when Max(i+m, j+n) is equal to or smaller than f(i, j), the output value g(i, j) of the pixel of interest (i, j) is represented by the formula 2:

$$g(i,j)=f(i,j) \quad (2)$$

wherein m and n denote an integer in the range of −2 to 2.

Figures 8A, 8B:
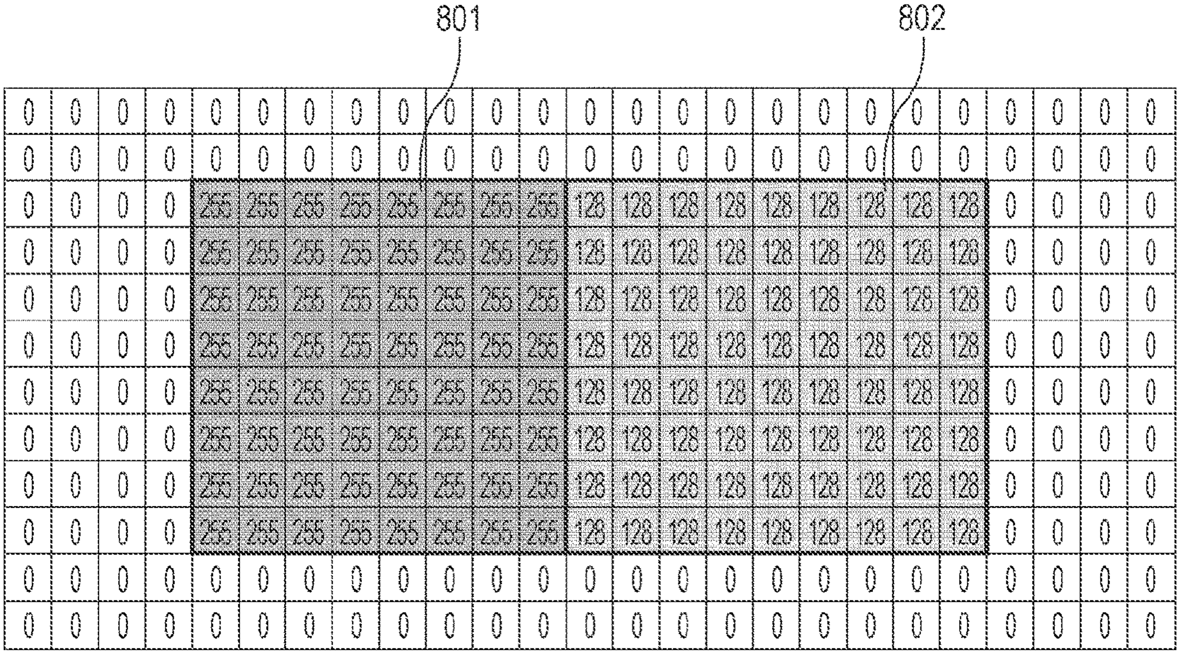
FIGS. 8A to 8D are explanatory views of multi-valued expansion filtering according to some embodiments.

FIG. 8B is a schematic view of multi-valued ink data of a coloring material ink, illustrating a region 801 in which the application amount of coloring material ink is 100% adjacent to a region 802 in which the application amount of coloring material ink is 50%. One pixel corresponds to 8-bit data. A pixel with a duty of 100% has a tone value of 255, and a pixel with a duty of 50% has a tone value of 128. The application amount of coloring material ink is 0% in a pixel with a tone value of 0.

Figure 8C:
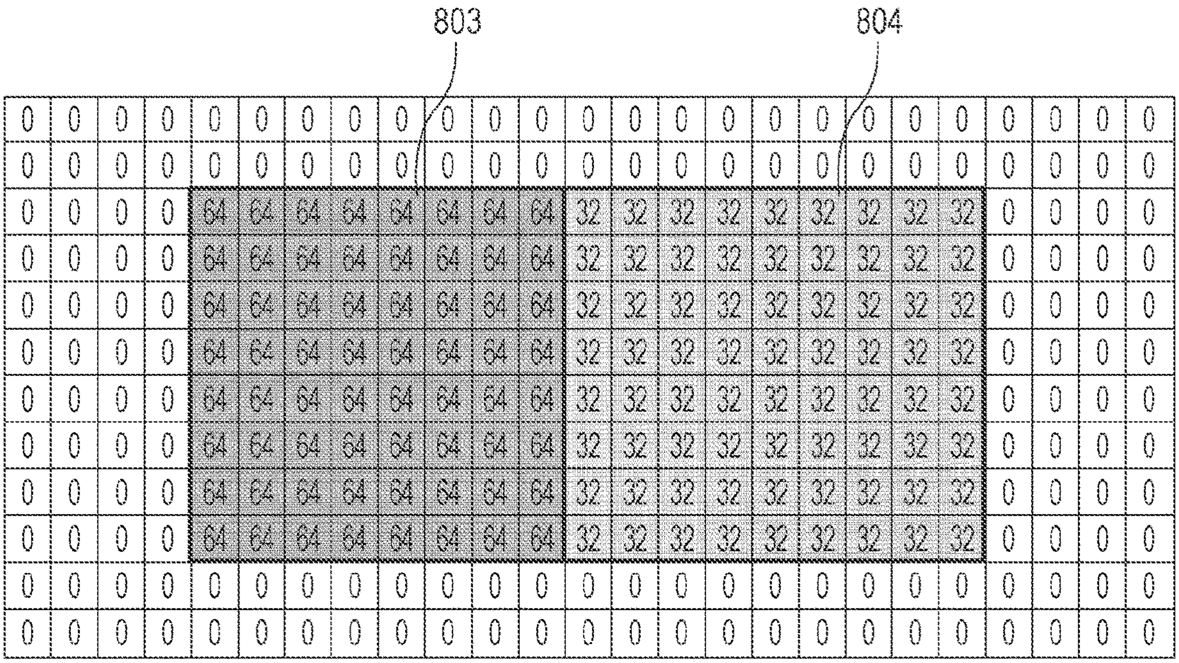

FIG. 8C illustrates multi-valued reaction liquid data based on the coloring material ink data of FIG. 8B. The region 801 in which the application amount of coloring material ink is 100% has a tone value of 64 in the reaction liquid data. The region 802 in which the application amount of coloring material ink is 50% has a tone value of 32 in the reaction liquid data. The multi-valued reaction liquid data is generated such that the tone value is lower than the tone value of each pixel of the coloring material ink data. Thus, the amount of reaction liquid to be applied is smaller than the amount of coloring material ink to be applied. As in the coloring material ink data, the application amount of reaction liquid is 0% in a pixel with a tone value of 0.

Figure 8D:
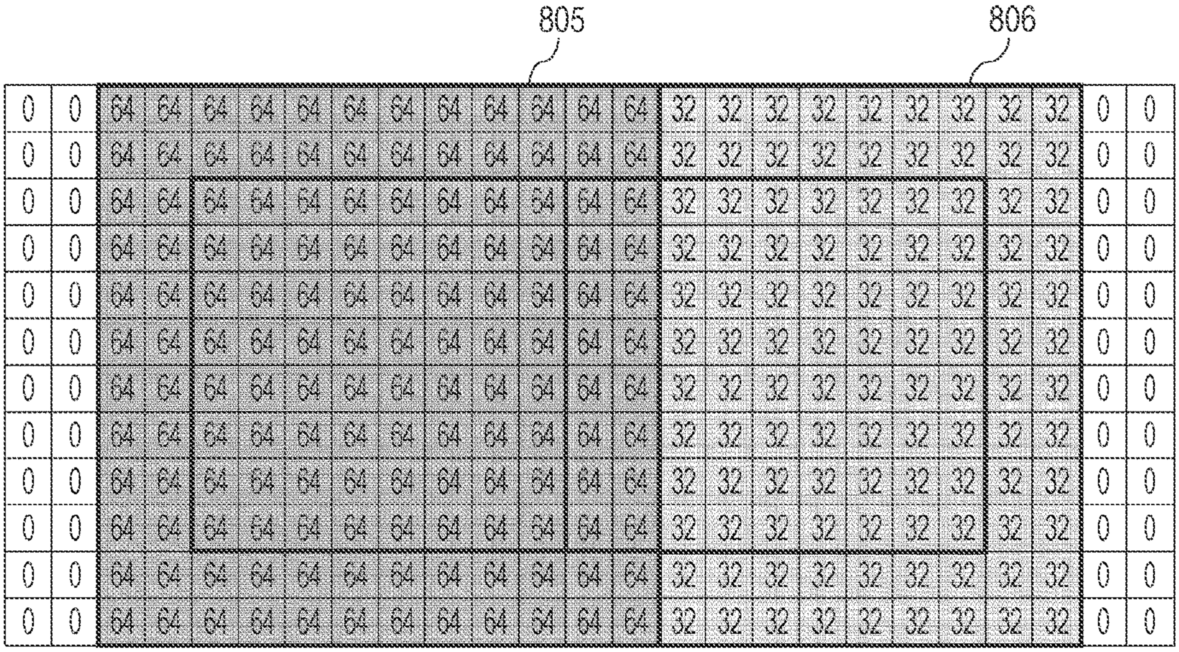

FIG. 8D illustrates the result of applying the maximum value filter of 5×5 pixels of FIG. 8A to all the pixels of FIG. 8C under the conditions described above. A region 805 includes pixels with a tone value of 64, and a region 806 includes pixels with a tone value of 32. The pixels with a tone value of 64 in the reaction liquid data in FIG. 8C are vertically and horizontally expanded by two pixels in the reaction liquid data in FIG. 8D, and pixels with a tone value of 32 at a boundary section in FIG. 8C are converted to pixels with a tone value of 64. Consequently, an amount of reaction liquid larger than the application amount based on coloring material ink data is applied to a two-pixel boundary region in the region 802 of the coloring material ink data adjacent to the region 801.

Figure 9:
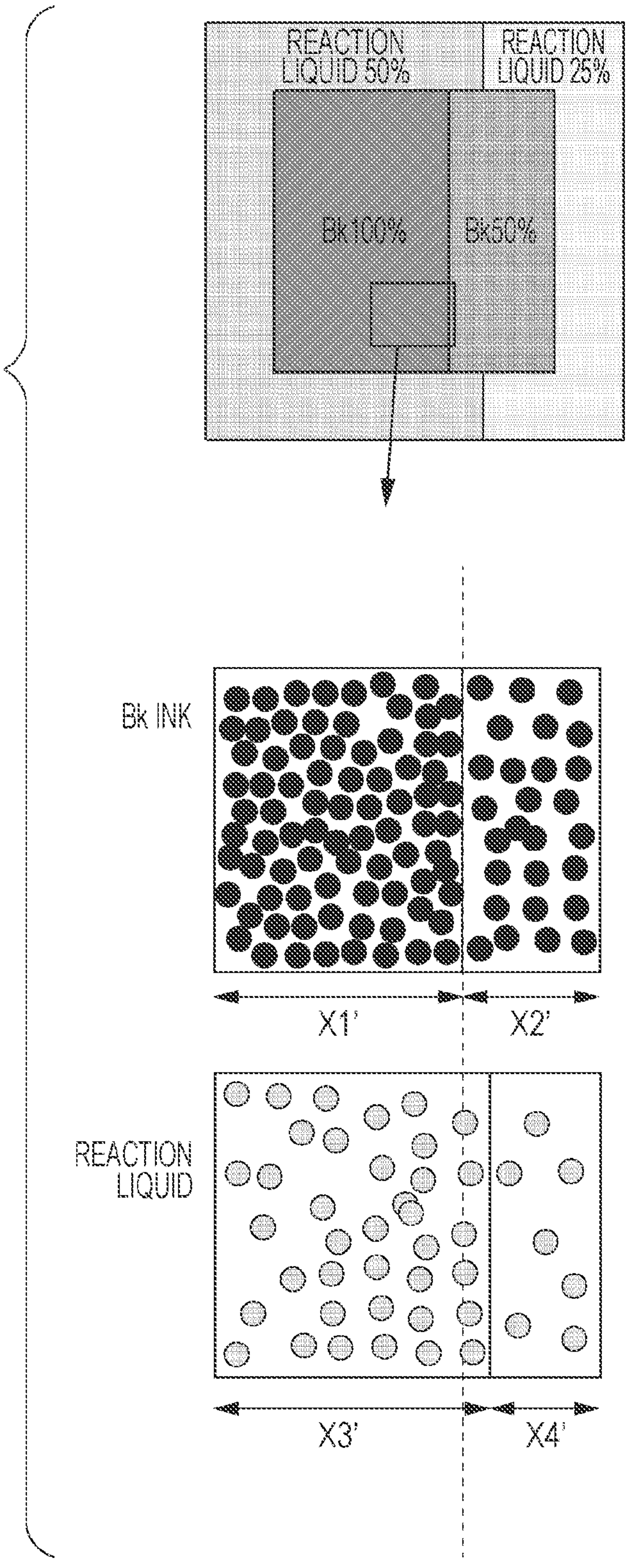
FIG. 9 are views of image processing results according to the first embodiment.

FIG. 9 are explanatory views of the effects of applying the configuration of the present embodiment. It is assumed that recording an image on the basis of the coloring material ink data of FIG. 8A and the reaction liquid data of FIG. 8D causes dot misalignment. In FIG. 9, a region with a large application amount of reaction liquid is expanded. Even when dot misalignment occurs between a coloring material ink and the reaction liquid at a boundary section between two regions with different application amounts of the coloring material ink, a region X3' in which the application amount of the reaction liquid is 50% overlaps a region X1' in which the application amount of the coloring material ink is 100%.

As described above, in the present embodiment, a pixel value in the reaction liquid data is expanded by applying the maximum value filter to the reaction liquid data to change the value of a pixel of interest to the maximum value of surrounding pixels adjacent to the pixel of interest. This can reduce the occurrence of blurring due to the shortage of reaction liquid at a boundary between two regions of a coloring material ink with different duties even when dot misalignment of ink occurs.

In the present embodiment, the maximum value filter has a shape of 5×5 pixels, and the adjoining pixels are 24 pixels surrounding the pixel of interest. The present disclosure is not limited to this, and any square filter of any size may be used. For example, the size of the filter may be changed depending on the type of recording medium. A larger filter is used for a recording medium with a surface easily blurred or for a recording medium with a smaller thickness and with a larger distance from a recording head because dot misalignment between a coloring material ink and a reaction liquid tends to increase. The size of the filter may also be changed depending on the scanning speed of a recording head. A larger filter is used for a recording head with a higher scanning speed because dot misalignment between a coloring material ink and a reaction liquid tends to increase. An instruction on the size of the filter may be received from the user.

In the present embodiment, a larger amount of reaction liquid is applied to a boundary region of a region with a relatively small application amount of coloring material ink adjacent to a region with a relatively large application amount of coloring material ink than to an inner region not adjacent to the region with a relatively large application amount of coloring material ink. Although the application amount of reaction liquid in the boundary region is the same as in the region with a larger application amount of coloring material ink in the above example, they may not be exactly the same.

The size of the filter may also be changed depending on the transfer speed of a recording medium. For a recording apparatus that ejects coloring material inks and a reaction liquid simultaneously with the conveyance of a recording medium, a larger filter is used at a higher transfer speed of the recording medium because dot misalignment between the coloring material inks and the reaction liquid tends to increase with the transfer speed. The size of the filter may also be changed depending on the distance between a recording head and a recording medium. A larger filter is used for a larger distance between a recording head and a recording medium because dot misalignment between a coloring material ink and a reaction liquid tends to increase with the distance. The size of the filter may also be changed depending on the recording mode. For a recording mode with a large dot misalignment between a coloring material ink and a reaction liquid, a large filter may be used.

Second Embodiment

In the embodiment described above, one K ink is used for processing. In the present embodiment, processing using ink data of coloring material inks of a plurality of colors is described for an ink jet recording apparatus including the coloring material inks of a plurality of colors. A method of a multi-valued expansion filter according to the present embodiment is described in detail below with reference to FIGS. 8A to 8D. For example, for ink data of four colors CMYK, the ink data in FIG. 8B include the tone values of the four colors in total, represented by 1024 tones from 0 to 1023. When the four colors have a duty of 100% in total, the region 801 has a tone value of 255. On the other hand, the region 802 adjacent to the region 801 and with a duty of the four colors of 50% in total has a tone value of 128. The application amount of coloring material ink is 0% in a pixel with a tone value of 0.

In the multi-valued reaction liquid data of FIG. 8C, the region 801 with a duty of the four CMYK colors of 100% in total has a tone value of 64 in the reaction liquid data, and the region 802 with a duty of the four colors of 50% in total has a tone value of 32 in the reaction liquid data. As in the coloring material ink data, the application amount of reaction liquid is 0% in a pixel with a tone value of 0.

FIG. 8D illustrates the result of applying the maximum value filter of 5×5 pixels of FIG. 8A to all the pixels of FIG. 8C under the conditions described above. As in the first embodiment, for the ink data of the four CMYK colors, an amount of reaction liquid larger than the application amount based on coloring material ink data is applied to a two-pixel boundary region in the region 802 of the coloring material ink data adjacent to the region 801.

Thus, in the present embodiment, also for ink data of a plurality of colors, the occurrence of blurring due to the shortage of reaction liquid at a boundary between two regions of a coloring material ink with different total duties can be reduced when dot misalignment of ink occurs.

In the present embodiment, the tone values in reaction liquid data are determined by the total duty of coloring material inks. On the other hand, it is known that the occurrence of blurring (bleeding) varies depending on the combination of coloring material inks. A tone value in reaction liquid data may be changed depending on the combination of coloring material inks so that a larger amount of reaction liquid can be applied for a combination of coloring material inks that tends to cause blurring (bleeding). For example, when the region 801 has ink data M and a tone value of 255, and the region 802 has ink data C and a tone value of 128, the tone values in the reaction liquid data of the region 801 and the region 802 may be 64 and 32, respectively, and when the region 801 has ink data Y and a tone value of 255, and the region 802 has ink data Bk and a tone value of 128, the tone values in the reaction liquid data of the region 801 and the region 802 may be 96 and 48, respectively.

Third Embodiment

In the embodiment described above, the shape of the multi-valued expansion filter in the step S603 is square, and the reaction liquid is vertically and horizontally expanded by the same amount of two pixels from a high-duty region to a low-duty region. On the other hand, in a serial type recording apparatus that records an image by moving a recording head in a direction orthogonal to the conveying direction of a recording medium P, dot misalignment tends to increase in the scanning direction of the recording head than in the conveying direction. Thus, it is desirable to reduce blurring in the scanning direction and decrease the application amount of reaction liquid in the conveying direction to reduce detrimental effects caused by excessive application of the reaction liquid, such as lower gloss. The present embodiment addresses such problems by making expansion in the conveying direction smaller than expansion in the scanning direction.

A method of a multi-valued expansion filter according to the present embodiment is described in detail below with reference to FIGS. 10A and 10B. The multi-valued ink data of the coloring material ink of FIG. 8B and the multi-valued reaction liquid data of FIG. 8C based on the multi-valued ink data of FIG. 8B are the same as those in the first embodiment.

In the multi-valued reaction liquid data of FIG. 8C, a maximum value filter of 5×3 pixels illustrated in FIG. 10A is applied as a multi-valued expansion filter to the pixel of interest (i, j). The value of the pixel of interest (i, j) is updated to the maximum value of 15 pixels of 5×3 pixels. When the maximum value Max(i+m, j+n) of 8-bit values of surrounding pixels (i+m, j+n) is larger than the 8-bit value f(i, j) of the pixel of interest (i, j), the output value g(i, j) of the pixel of interest (i, j) is represented by the formula 3:

$$g(i,j)=\mathrm{Max}(i+m,j+n) \tag{3}$$

and when Max(i+m, j+n) is equal to or smaller than f(i, j), the output value g(i, j) of the pixel of interest (i, j) is represented by the formula 4:

$$g(i,j)=f(i,j) \tag{4}$$

wherein m denotes an integer in the range of −1 to 1, and n denotes an integer in the range of −2 to 2.

FIG. 10B illustrates reaction liquid data after an expansion process obtained by applying the maximum value filter of FIG. 10A to the multi-valued reaction liquid data of FIG. 8C. As illustrated in FIG. 10B, applying the 5×3 maximum value filter of FIG. 10A under the conditions described above expands pixels with a tone value of a reaction liquid of 64 vertically by one pixel and horizontally by two pixels.

The shape of the maximum value filter may be longer in the conveying direction than in the scanning direction. For example, the maximum value filter may have a shape of 3×5 pixels. The present embodiment can decrease the expansion of a reaction liquid in the direction in which dot misalignment is less likely to occur relative to the direction in which dot misalignment is more likely to occur, thereby preventing blurring due to the shortage of reaction liquid caused by dot misalignment and lower image quality caused by excessive application of the reaction liquid, such as lower gloss.

Fourth Embodiment

In the embodiment described above, the multi-valued expansion filter applies the maximum value filter to the pixel of interest (i, j) and updates the value of the pixel of interest (i, j) to the maximum value of the pixels in the filter.

When expanding a region to which a reaction liquid is applied makes the boundary between the expanded portion and the non-expanded portion conspicuous due to the difference in the amount of the reaction liquid, however, the difference in the amount of the reaction liquid between the expanded portion and the non-expanded portion can be minimized. At the same time, to reduce the decrease in gloss, it is also desired to minimize the application amount of reaction liquid. Thus, the present embodiment addresses such a problem by increasing the amount of reaction liquid in the expanded portion relative to the amount of reaction liquid before the expansion and decreasing the amount of reaction liquid in the expanded portion relative to the maximum value of the amount of reaction liquid in surrounding pixels.

FIGS. 11A and 11B are explanatory views of a multi-valued expansion filter used in the present embodiment. The multi-valued ink data of the coloring material ink of FIG. 8B and the multi-valued reaction liquid data of FIG. 8C based on the multi-valued ink data of FIG. 8B are the same as those in the first embodiment.

In the multi-valued reaction liquid data of FIG. 8C, a multi-valued expansion filter with a size of 5×5 pixels illustrated in FIG. 11A is applied. Thus, the value of the pixel of interest (i, j) is updated to a value smaller than the maximum tone value of the 5×5 pixels. When the maximum value Max(i+m, j+n) of 8-bit values of surrounding pixels (i+m, j+n) is larger than the 8-bit value f(i, j) of the pixel of interest (i, j) and when Max(i+m, j+n)−f(i, j) is more than 32, the output value g(i, j) of the pixel of interest (i, j) is represented by the formula 5:

$$g(i,j)=\tfrac{3}{4}\times(\mathrm{Max}(i+m,j+n)-f(i,j))+f(i,j) \quad (5)$$

wherein g(i, j) is an integer, and a calculation result of a decimal number is rounded up.

When Max(i+m, j+n) is larger than f(i, j) and when Max(i+m, j+n)−f(i, j) is 32 or less, g(i, j) is represented by the formula 6:

$$g(i,j)=\tfrac{1}{2}\times(\mathrm{Max}(i+m,j+n)-f(i,j))+f(i,j) \quad (6)$$

wherein g(i, j) is an integer, and a calculation result of a decimal number is rounded up.

On the other hand, when Max(i+m, j+n) is equal to or smaller than f(i, j), g(i, j) is represented by the formula 7:

$$g(i,j)=f(i,j) \quad (7)$$

wherein m and n denote an integer in the range of −2 to 2.

Under the conditions described above, applying the 5×5 filter of FIG. 11A to all the pixels in the reaction liquid data of FIG. 8C yields the output value of the reaction liquid data illustrated in FIG. 11B. A region 1111 in which the application amount of reaction liquid is 64 is expanded by two pixels in a region 1112 in which the amount of reaction liquid is 32 and forms a region 1121 in which g (i, j)=58. The region 1111 is also vertically and horizontally expanded by two pixels in a region 1113 in which the amount of reaction liquid is 0 and forms a region 1122 in which g (i, j)=48. The region 1112 in which the amount of reaction liquid is 32 is vertically and horizontally expanded by two pixels in the region 1113 in which the amount of reaction liquid is 0 and forms a region 1123 in which g (i, j)=16.

When Max(i+m, j+n) is larger than f(i, j) and when Max(i+m, j+n)−f(i, j) is more than 32, the output value g(i, j) is not limited to the formula 5 and may satisfy the formula 8:

$$\mathrm{Max}(i+m,j+n)>g(i,j)>\tfrac{3}{4}\times(\mathrm{Max}(i+m,j+n)-f(i,j))+f(i,j) \quad (8)$$

When Max(i+m, j+n) is larger than f(i, j) and when Max(i+m, j+n)−f(i, j) is 32 or less, the output value g(i, j) is not limited to the formula 6 and may satisfy the formula 9:

$$\mathrm{Max}(i+m,j+n)>g(i,j)>\tfrac{1}{2}\times(\mathrm{Max}(i+m,j+n)-f(i,j))+f(i,j) \quad (9)$$

Although represented by the formulae (8) and (9), the conditions for the output value g (i, j) may also be represented by any formula that satisfies Max(i+m, j+n)>g(i, j). Furthermore, although the conditional formulae are two in the present embodiment, the conditional formulae may be one or three or more.

The present embodiment can reduce the difference in the amount of reaction liquid between the expanded portion and the non-expanded portion of the reaction liquid portion to make the boundary between the expanded portion and the non-expanded portion inconspicuous. The present embodiment can also reduce the decrease in gloss.

Fifth Embodiment

Although the multi-valued expansion filter is used for the expansion process in the embodiment described above, another method may use a unit other than the filter. In the present embodiment, an expansion process is performed without a filter.

Figure 12A:
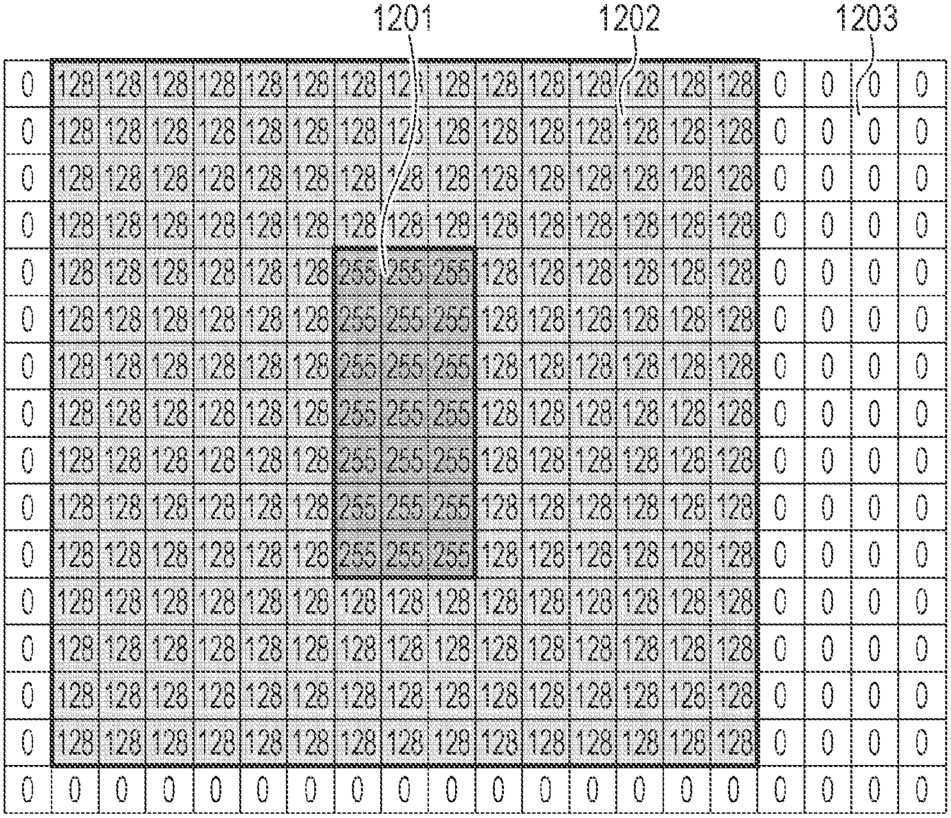
FIGS. 12A to 12E are explanatory views of multi-valued expansion filtering according to a fifth embodiment.
Figure 12B:
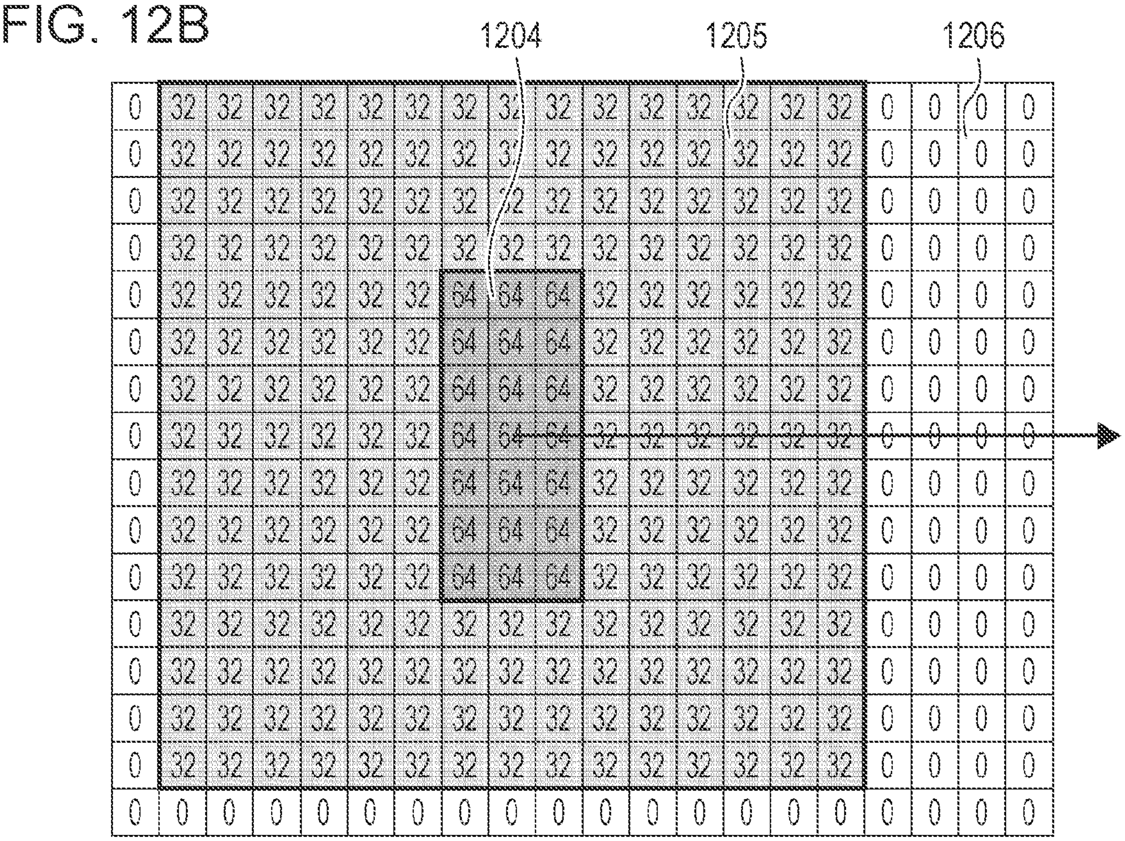
Figure 12C:
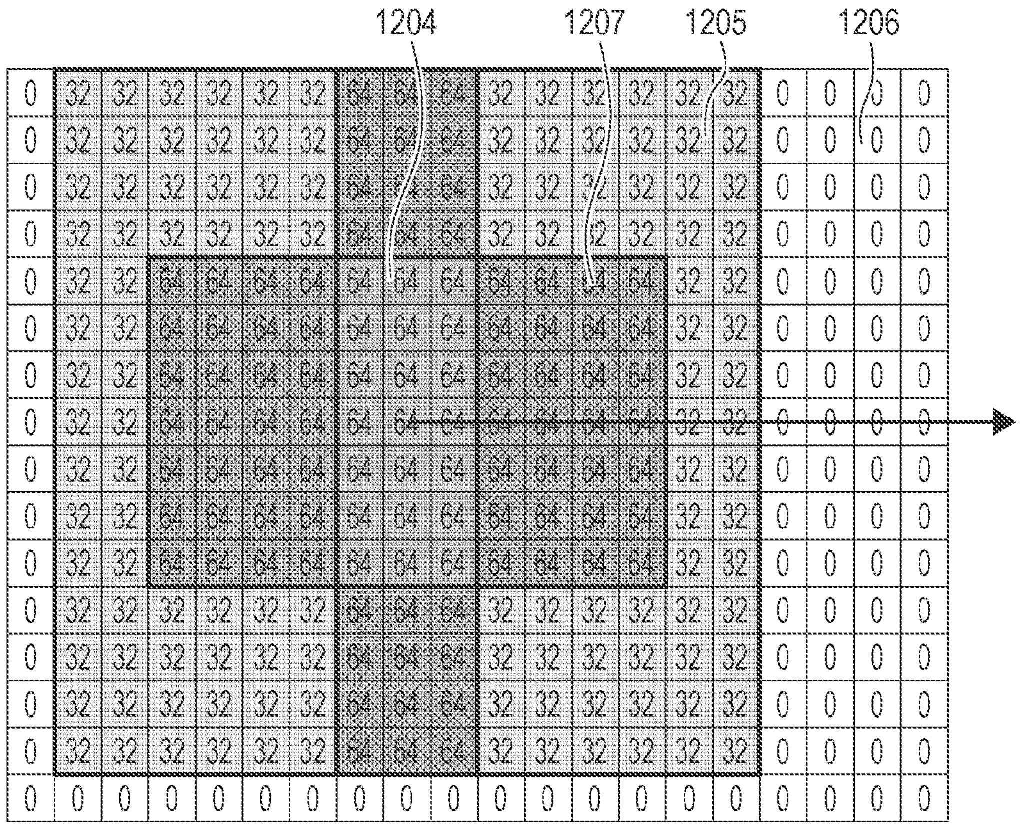
Figure 12D:
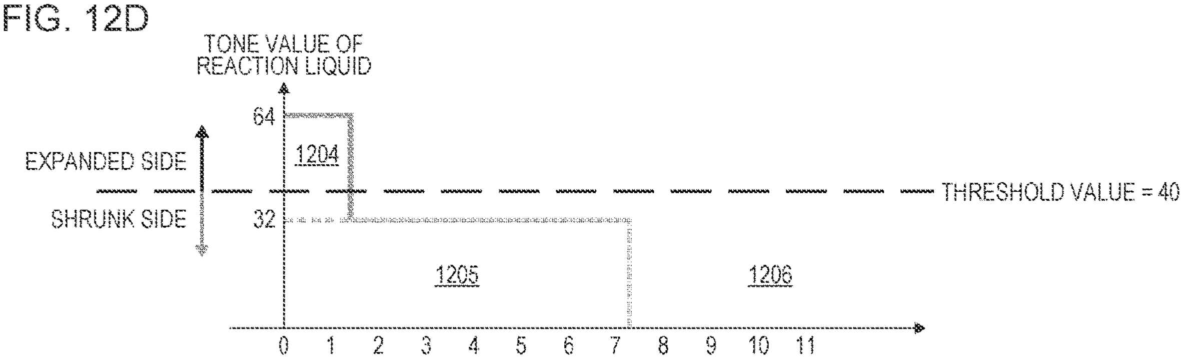
Figure 12E:
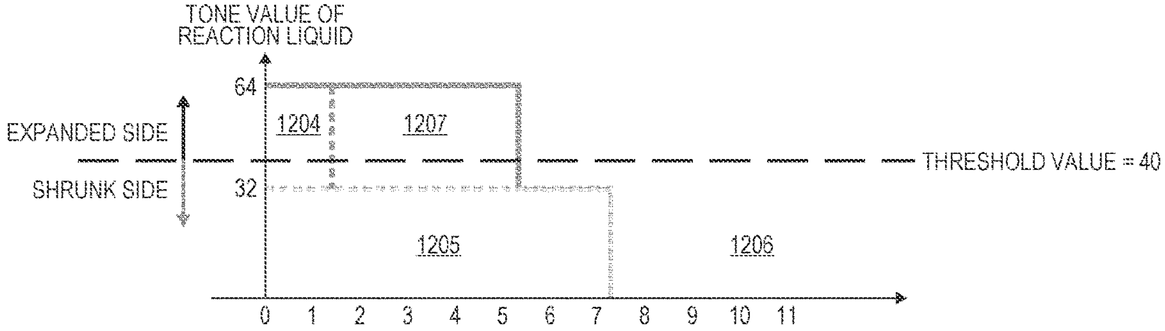

FIGS. 12A to 12E are explanatory views of an expansion process in the present embodiment. FIG. 12A is a schematic view of multi-valued ink data of a coloring material ink, illustrating a region 1201 in which the application amount of coloring material ink is 100% adjacent to a region 1202 in which the application amount of coloring material ink is 50%. One pixel corresponds to 8-bit data. A pixel with a duty of 100% has a tone value of 255, and a pixel with a duty of 50% has a tone value of 128. In pixels with a tone value of 0 in a region 1203, the application amount of coloring material ink is 0%. FIG. 12B illustrates multi-valued reaction liquid data based on the coloring material ink data of FIG. 12A. The region 1201 in which the application amount of coloring material ink is 100% has a tone value of 64 in the reaction liquid data. The region 1202 in which the application amount of coloring material ink is 50% has a tone value of 32 in the reaction liquid data. As in the coloring material ink data, the application amount of reaction liquid is 0% in a pixel with a tone value of 0. FIG. 12D illustrates the change in tone value in the direction of the arrow in FIG. 12B from a region 1204 in which the reaction liquid has a tone value of 64. As illustrated in FIG. 12D, a threshold 40 is set for the tone value of the reaction liquid data. Reaction liquid data with a tone value higher than the threshold 40 correspond to expanded pixels, and reaction liquid data with a tone value lower than the threshold correspond to shrunk pixels. When an expanded pixel is adjacent to a shrunk pixel, the data of the expanded pixel are vertically and horizontally copied and replaced by four pixels in the region of the shrunk pixel. Consequently, part of a region 1205 in which the reaction liquid has a tone value of 32 becomes a region 1207 with a tone value of 64 in FIGS. 12C and 12E. When expanded pixels are adjacent to each other or when the shrunk pixels are adjacent to each other, the replacement process is not performed. For example, the region 1205 with a tone value of 32 smaller than the threshold value 40 and the region 1206 with a tone value of 0 smaller than the threshold value 40 are shrunk pixels, and because the shrunk pixels are adjacent to each other the replacement process from the region 1205 to the region 1206 is not performed. The expansion process in the present embodiment may be performed by an ASIC or by software.

The present embodiment can reduce the occurrence of blurring due to the shortage of reaction liquid at a boundary between two regions of a coloring material ink with different duties caused by ink dot misalignment without using a filter.

OTHER EMBODIMENTS

Although a filter is used for the multi-valued expansion process in the first to fourth embodiments, the filter may not be used. For example, there is a method of detecting regions with a tone difference and multiplying multi-valued data at a boundary section by a factor to increase the value.

Although the maximum value in a region corresponding to the filter size is used in the above embodiments, the maximum value may not be used. In the expansion process, it is sufficient if the value can be changed to a value larger than the tone value of a pixel of interest.

Furthermore, although it is assumed that the expansion process is performed in the above embodiments, whether the expansion process is performed or not may depend on the attribute of print data. For example, when the attribute of print data is a "picture", the expansion process may not be performed, and when the attribute of print data is "character/line drawing", the expansion process may be performed.

Furthermore, although reaction liquid data for applying a reaction liquid are described in the above embodiments, the above configuration can also be applied to clear emulsion ink (Em) used to improve glossiness.

Furthermore, although the serial type recording apparatus is used in the above embodiments, a line head type recording apparatus may also be used, in which a recording medium P is scanned with respect to a fixed recording head to record an image.

The present disclosure can reduce degradation of image quality due to blurring caused by dot misalignment between an ink containing a coloring material and a reaction liquid.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority of Japanese Patent Application No. 2021-154546 filed Sep. 22, 2021, which is hereby incorporated by reference herein in its entirety.

What is claimed is:

1. A recording apparatus comprising:

a recording unit configured to record an image on a recording medium by applying an ink containing a coloring material and a reaction liquid containing a component that aggregates the coloring material;

an acquisition unit configured to acquire multi-valued ink data to apply the ink; and a generating unit configured to generate first multi-valued reaction liquid data based on the multi-valued ink data and, when a tone value of a pixel of interest in the first multi-valued reaction liquid data is lower than a tone value of any one of a plurality of surrounding pixels around the pixel of interest, generate second multi-valued reaction liquid data by increasing the tone value of the pixel of interest, wherein each pixel of the first multi-valued reaction liquid data has a lower tone value than the multi-valued ink data.

2. The recording apparatus according to claim 1, wherein the generating unit generates the second multi-valued reaction liquid data by changing the tone value of the pixel of interest in the first multi-valued reaction liquid data to a maximum tone value of the plurality of surrounding pixels.

3. The recording apparatus according to claim 1, wherein the generating unit generates the second multi-valued reaction liquid data by using a filter for the first multi-valued reaction liquid data.

4. The recording apparatus according to claim 1, further comprising a quantization unit configured to generate quantization data indicating whether or not the ink and the reaction liquid are supplied from the recording unit by quantizing the multi-valued ink data and the multi-valued reaction liquid data.

5. The recording apparatus according to claim 1, further comprising a control unit configured to record an image on a recording medium by controlling a recording operation from the recording unit based on the quantization data.

* * * * *